United States Patent
Gehring (10) Patent No.: US 7,747,563 B2
(45) Date of Patent: Jun. 29, 2010

(54) SYSTEM AND METHOD OF DATA MOVEMENT BETWEEN A DATA SOURCE AND A DESTINATION

(75) Inventor: Scott Gehring, Doylestown, PA (US)

(73) Assignee: Breakaway Technologies, Inc., Yardley, PA (US)

( * ) Notice: Subject to any disclaimer, the term of this patent is extended or adjusted under 35 U.S.C. 154(b) by 382 days.

(21) Appl. No.: 11/952,293

(22) Filed: Dec. 7, 2007

(65) Prior Publication Data

US 2008/0140692 A1    Jun. 12, 2008

Related U.S. Application Data

(60) Provisional application No. 60/869,410, filed on Dec. 11, 2006.

(51) Int. Cl.
    *G06F 17/30* (2006.01)
(52) U.S. Cl. .................. 707/602; 707/605; 707/607; 707/754; 707/756
(58) Field of Classification Search .................. 707/602, 707/605, 607, 736, 754, 756, 101, 104.1
    See application file for complete search history.

(56) References Cited

U.S. PATENT DOCUMENTS

| | | | |
|---|---|---|---|
| 6,151,608 A | 11/2000 | Abrams | |
| 6,208,990 B1 | 3/2001 | Suresh et al. | |
| 6,256,676 B1 * | 7/2001 | Taylor et al. | 709/246 |
| 6,690,648 B2 | 2/2004 | Niida et al. | |
| 6,738,975 B1 * | 5/2004 | Yee et al. | 719/310 |
| 6,779,035 B1 | 8/2004 | Gbadegesin | |
| 6,889,181 B2 | 5/2005 | Kerr et al. | |
| 6,912,539 B1 | 6/2005 | Kapitanski et al. | |
| 6,976,029 B2 | 12/2005 | Venkatesh et al. | |
| 2001/0049694 A1 * | 12/2001 | Daudenarde | 707/200 |
| 2005/0044097 A1 | 2/2005 | Singson et al. | |
| 2005/0125436 A1 | 6/2005 | Mudunuri et al. | |
| 2005/0187874 A1 | 8/2005 | Sanal | |
| 2005/0187991 A1 | 8/2005 | Wilms et al. | |
| 2005/0256892 A1 | 11/2005 | Harken | |
| 2008/0288889 A1 * | 11/2008 | Hunt et al. | 715/810 |

* cited by examiner

Primary Examiner—Leslie Wong
(74) Attorney, Agent, or Firm—Gregory J. Gore & Associates (57) ABSTRACT

A method of data migration and integration with a data load mechanism. The first primary step is to extract the data from a named source by remote queries. The follow-up logic is used for any miscellaneous or supplemental transformations to inbound data for data renaming, null scrubbing, and data polishing. The filtration step allows for any extraneous data to be filtered out. The compression step consolidates any fragmented balances residual in the remote queries, localize remote data, data map, or follow-up logic. As a part of the compression process, the result set table signature is explicitly cast to that of the destination fact table. The result of this is an exact replica of the destination fact table format, data types and column order. The kickout handling provides referential integrity of the inbound data flow against the named BPM Destination System. Finally, the deployment step limits the dynamic reload or sync determination to certain fields.

5 Claims, 5 Drawing Sheets

FIG. 1
Summary of Invention

FIG. 2
Simplified Workflow

FIG. 3
Software Components

FIG. 4
Data Connection Methodology

FIG. 5
Detailed Workflow of Data Connection Methodology ized data-warehouse-type environment and not a fluid BPM-type environment. Data Warehouse environments provide a highly standardized and generic enterprise-wide framework, designed to accommodate a wide array of data access protocols, business rules, and in many cases exceptionally large data volumes, independent of platform or business scenario. ETL was designed to move data in and out of these types of environments; therefore ETL-related concepts are also very generic, a one-size-fits-all approach.

SYSTEM AND METHOD OF DATA MOVEMENT BETWEEN A DATA SOURCE AND A DESTINATION

FIELD OF THE INVENTION

This invention relates to remote database management systems (RDMS) and online analytical process systems (OLAP) systems, specifically in the field of enterprise resource planning (ERP), general ledger accounting systems (GL) and business performance management (BPM)/business intelligence (BI) based software solutions.

BACKGROUND OF THE INVENTION AND PRIOR ART

The system integration landscape is more fluid and dynamic than ever before. Wide acceptance of the internet in day-to-day business has accelerated access to information. This increase in information access efficiency has set a higher standard for decision making and analytical capabilities for both individuals and organizations alike. New specialty fields have arisen to accommodate this need for faster, more accurate analytical and predictive capabilities. One field in particular has evolved into what is widely accepted as Business Intelligence (BI) or Business Performance Management (BPM). The underpinning and enabler of this evolution is a technology called OLAP (on-line analytical processing). These fields have driven a wave of new, more powerful analytical and decision making software products and technologies. These applications have become a key part of modern day business and handle such core business processes as budgeting, forecasting, sales analysis, strategical planning, trend analysis, salary planning, capital planning, and headcount, just to name a few. Businesses utilize these decision and analytical tools to gain competitive advantage, report financials and make long term decisions about the direction of their business.

The data required to satisfy a holistic analytical or predictive process is spread in a wide array of databases, platforms and systems throughout an organization. Systems include ERP (enterprise resource planning), CRM (customer relationship management), trade promotion, distribution, etc. Data warehousing methods attempt to solve this by consolidating the disparate data into a standardized central repository, where other systems (such as BI/BPM reporting tools) can access the data in a logical easy-to-use fashion, insulated from the complexity of the source systems.

The ability to consolidate and integrate data from system to system is based on a logical framework known as ETL: extraction, transformation, and load. Many integration tools and methodologies have been designed within the scope of the ETL framework. These processes optimize and accelerate the throughput of data between source and destination systems, complete with required controls (logging, validation, transformation, aggregation). BI/BPM tools directly utilize ETL to import data into their own data/meta-bases, proprietary or otherwise. Most BI/BPM tools provide some kind of ETL mechanism.

Despite these sophisticated ETL mechanisms, there is still a demand in the BPM marketplace for more-effective data exchange between BPM systems and corporate systems. The source of this demand stems from the fact that analytical processes have been evolving faster than integration processes. The shortcomings of today's current integration tools and techniques lie in the fact that modern ETL concepts were developed around the needs of a standardized data-ware- This provides little in the way of reusable, optimized, scenario-based integration processes. The integration patterns between source and destination are constantly re-engineered between the extraction phase, the transformation phase, and the load phase. Applied scenarios are left up to the individual developer or implementation team. In the extraction phase, for example, the source may be an ERP system, or a CRM system, or a lead tracking system, or some kind of custom data store. The technology platforms, protocols and schemes between these sources can vary tremendously. Even within the ERP realm there is still a wild fluctuation in platform and database schema design among vendors. In the transformation phase, application of transformational techniques may depend on the type of industry, the business rules that industry applies, and the integrity of the inbound data. The load phase shares the same problem as the extraction phase: the destination databases may have radically different schemas, platforms, protocols and/or a unique set of requirements. The combination of variables within each individual phase, let alone the combination of all three, can be dizzying. Due to this high selectivity, historically, this has left little in the way of reusable or standardized processes within applied scenarios. Essentially, custom ETL process and custom patterns must be employed for each scenario, therefore increasing the cost and time of development. This spawns a further impediment innate with all custom software solutions: the ability to effectively transfer knowledge between individuals and organizations. This impediment is due to lack of standardization and is driven by the coding techniques, skills, languages, even style of the individual developer. Each solution has to be relearned. This presents challenges for ongoing support and maintenance of the application. This invention addresses this challenge in the form of reusable Integration Templates.

For BI/BPM to obtain maximum effectiveness within an organization, individualized, highly targeted and specialized integration processes are required. These processes require more-specific reusable techniques and more clearly defined processes to accommodate efficient integration between targeted sources and destinations, more than what a generic ETL framework provides today.

Most packaged BI/BPM software solutions on the marketplace today embrace a multiphase approach. This is primarily for two reasons: (A) there is no single apparatus on the marketplace today that effectively provides the single-point BPM capability, and (B) application integration is not the BI/BPM software vendors' area of expertise, so they have little in the way of resources to build this into their applications effectively.

BPM destination systems can capture data through a variety of methods. These methods may be system feed data via a data load mechanism or end-user input via an application interface. As data is entered into the OLAP destination system, regardless of the method, unique data intersection points can become fragmented. The larger volume of input, the higher degree of fragmentation tends to occur. There are two types of fragmentation that can occur in BPM destination systems: horizontal fragmentation and vertical fragmentation. Vertical fragmentation is defined as the accumulation of intersection differences across database rows. Horizontal fragmentation is defined as accumulation of intersection differences across columns or tables. Data fragmentation, if not addressed, can cause exponential performance degradation of the BPM destination system and use unnecessary system resources.

The schema implementation of BI/BPM/OLAP-based databases is different from the classic relational model applied in RDMS systems or data warehousing scenarios. The classic RDMS model tends to apply a highly normalized state to its data schema. This highly normalized state is optimal for storage, organization, input and management of large amounts of data. While normalization is effective for the functional characteristics of data storage, it tends to present challenges from a business usability perspective. OLAP, on the other hand, implements its data schema in a highly de-normalized fashion (the reverse of the RDMS). De-normalization of data is not designed for functional efficiency, but more around business usability, data accessibility, and data access performance. Many times this data is loaded into cubes for aggregation and hierarchical pre-calculation capabilities. A de-normalized, cube-based schema requires special consideration and unique techniques applied when moving data through the transformation pipeline.

The closest prior art of which the applicant is aware includes U.S. Pat. No. 6,151,608 issued to Abrams and U.S. Pat. No. 6,208,990 issued to Suresh. The templates, patterns and pipelines employed by prior art U.S. Pat. Nos. 6,151,608 and 6,208,990 are designed to load to relational destination systems, while the present invention loads to OLAP- or dimensional-based destinations systems. The techniques employed are fundamentally different than relational destination techniques, and so are the underlying database platforms. U.S. Pat. No. 6,151,608 does not address required OLAP-based functions and is built solely around Oracle database platform. The migration rule templates, patterns and principles are subjected to Oracle database mechanics only, which severely limits its capability on SQL Server or Analysis Service based platforms. U.S. Pat. No. 6,208,990 is optimized for data warehousing environments but again does not address the particulars of a high performance, reusable single-point process designed for BPM systems. Cutting edge newer technologies have evolved away from primary keys to keyless data management. This presents new challenges for ETL not addressed in prior art load mechanisms.

Classic relational load models such as U.S. Pat. No. 6,151,608 rely heavily on the use of primary keys to determine row uniqueness and selectivity. Neither U.S. Pat. Nos. 6,151,608 nor 6,208,990 provide injectable integration templates.

SUMMARY OF THE INVENTION

This invention is a high performance, reusable BPM integration framework. This framework is designed to gain maximum holistic efficiency in the area of inbound transfer of GL data between BI/BPM/OLAP-based systems (from this point on, these systems will be referred to simply as BPM systems). Holistic efficiency is defined as the ability to move data point-to-point as quickly as possible between electronic sources, rapid application integration development, and connection standards; it provides an ETL (extraction, transformation, and load) function for data transmissions. It issues commands to extract data from a named data source. It processes, tracks, prepares and delivers data through a standard data pipeline, and syncs or reloads data to a named system destination.

The invention is a data load mechanism. Since data load mechanisms tend to generate much more input in a shorter period of time than end-user input, data fragmentation can rapidly become a problem. This invention automates the data optimization process as a part of the load process used in vertical compression and horizontal as an intrinsic part of its load time process.

The invention outlined here is specifically tailored around SQL Server and Analysis Services based technologies, thus requiring different internal data pipeline mechanics to optimize throughput. The invention herein identifies unique data intersections and synchronizes and/or reloads data against data intersection patterns without the use of primary keys. Uniqueness is determined instead based on consolidated data intersection patterns, not primary keys. This makes this invention highly novel as compared to prior art. This "keyless" type of synchronize-and reload mechanism is required and accepted practice in OLAP/BPM systems, and prior art is not equipped to handle this in an optimized fashion. When new data is loaded from an ERP source system and loaded into a keyless destination system such as an OLAP or business intelligence system, the need for data intersection load methodology needs to be addressed.

The invention herein employs an intersection coordination sub-system. The role of the intersection coordination sub-system is to identify intersections of existing data, new data, or data that needs to be deleted. This is a keyless methodology that relies on intersection matching rules rather than key matching rules. Intersections can transcend multiple logical and physical structures. OLAP destination systems can contain one or more fact tables. A fact table is defined as a de-normalized table structure containing business intelligence data. The data point that comprises a unique dimensional intersection may be spread across one or more of the fact tables. The OLAP destination system includes cubes (relational sub systems do not contain cubes).

The intersection coordination sub-system makes its matching decisions through the use of a concatenated subset of all columns in both the inbound data set and the targeted destination system table(s) at time of execution. These intersections are matched against one another and identified as one of three types of data: existing, new, and targeted deletions.

Once the intersection coordination sub-system completes its identification process, it then loads the new data into the destination system. There are two methodologies that can be employed: synchronize and reload.

There are three primary aspects to this invention. The contours of these parts can be arranged to adapt to the specific technical and business rules of any given named data source. Part 1 is a single-point BPM/OLAP based data connection methodology. Part 2 is a series of software components and workflows built around the data connection methodology to help facilitate its functionality, development, deployment, maintenance, and upgradeability. Part 3 is reusable integration templates. Integration templates are designed around specific integration scenarios and are injectable into the base framework. The injectable characteristic of the integration templates not only provides an element of reusability but also accelerated reusability, thus providing an exponential decrease in setup time and cost while simultaneously minimizing errors during the configuration stage.

The base BPM integration framework is designed to be installed on a company's data platform or server(s). Components can be installed onto a single server or can be physically and logically partitioned across multiple servers for enhanced scalability. Servers are required to run Microsoft® Windows server operating systems, Microsoft® RDMS/OLAP technology (SQL Server/Analysis Services), .NET framework, and Internet Information server (IIS).

This base framework is in essence an empty shell and has all the prerequisite mechanics for a potential integration. Once the initial installation of the base framework is complete, an integration template is applied. Integration templates can be built manually or may be injected into the base framework via an injection mechanism provided in the software.

The template contains the map between a given GL system and the destination BPM application type; this includes the required transformational layouts, business rules, source schema/meta-data contours, filters, and external processes. Template selection and/or manual development method is driven upon the integration scenario that is required at the time of integration.

This invention consists of software and workflow elements built around a standardized process/methodology. The marriage of these elements is designed to provide a functionality and service that does not exist in the current integration marketplace and to provide improvement to prior art inventions for the specific transfer of data between GL systems and cube-based BPM systems. This invention embraces single-point integration techniques vs. multiphase integration techniques and optimizes, automates and applies best practices to the techniques required for implementation.

BPM-based destination systems employ two primary classifications of inbound data: dimension vs. measure type data. The dimensions and measure are loaded into a fact table and then assimilated into a cube. The ETL data pipeline of this invention is specialized to optimize, delineate, manipulate, consolidate, and validate dimension and measure data, and to evoke the cube assimilation process as required. This invention assumes the destination system has dimensions, members and cubes. The elements of dimensions, measures and cubes, as an intrinsic part of the systemic process, combined with a tabular-based data pipeline are highly novel to this invention.

Multiple integration templates can be defined with the BPM integration framework. Each template conforms to the contours of the data connection methodology. The template process flow is single threaded, meaning only a single template can be run through the framework at any given time. This is by design and ensures referential integrity for the BPM destination system. There are two types of execution requests: on-demand and scheduled. On-demand requests are managed via a queuing mechanism that allows each job to be run through the data pipeline in a single-file manner. Scheduled requests are managed via a collision control mechanism. This collision control mechanism determines which request was made first and declares a winner. The losing process simply goes dormant until its next scheduled time. The Integration Templates provided in this invention are injectable via an injection mechanism into the base framework. This injectable nature accelerates the integration development lifecycle, reduces margin for developer error, and reduces cost for customers.

In addition to GL-based data transmission, this invention supports the ability to transmit data to other cubes or to a different location within the same cube. These types of transfers are known as cube-to-cube transfers or intra-cube transfers, respectively.

During standard load cycles in OLAP/BPM-based systems, there are two types of balance storage methodologies when addressing the loading of business intelligence data from a source GL system to BPM destination system. Management of the balance storage type is an essential part of the OLAP load process. Balance storage type management is not effectively addressed in prior art.

Depending on the type of business function that is being utilized by the named destination OLAP application, different load mechanics need to be applied to satisfy the BPM system numeric storage requirements around system measures. Prior art load methodologies do not address or automate this requirement. The invention herein is highly structured around the handling of Periodic vs. YTD (year to date) measure management and automates its handling through the use of a Columns-to-Rows conversion mechanism that is highly novel to this invention (Columns-to-Rows will be referred as simply CTOR for the remainder of this document). CTOR conversion is a highly specialized and reoccurring conversion unique to loading of OLAP/BPM measure data, and prior to this invention it would require complicated custom routines, many lines of code, and highly skilled developers. The CTOR conversion mechanism reads from a CTOR map. The CTOR map is a sub-component of the data mapping phase and is used to delineate between periodic and YTD balance types. How the balances are managed is dependent on how the CTOR map is configured. A developer maintains the capability to activate the CTOR where appropriate with little to no code via use of a configuration grid.

OLAP-based destination systems employ two primary classifications of inbound data: dimension vs. measure data. The dimension and measure data is loaded into a fact table and then assimilated into a cube. The ETL data pipeline of this invention is specialized to optimize, delineate, manipulate, consolidate, and validate dimension and measure data, and to evoke the cube assimilation process as required. This invention assumes the destination system has dimensions, members and cubes. This is distinctly unique to prior art, which does not address the dimensional or cube nature of the ETL process.

Member management is also provided in the form of "kickout" handling. This invention dynamically reads the OLAP destination meta-data definitions and validates inbound data for referential integrity against destination dimension model. An inbound data point that does not map to an existing dimension member is defined as a "kickout". Kickouts are routed from the inbound data pipeline into a specialized module for analysis by the tool administrator.

Prior art relational-based load mechanisms have employed a whole host of different data types including but not limited to nvarchar, varchar, integer, decimal, date, time, datetime, etc. This invention applies a simplified data-type superset to improve and more effectively meet the needs of a BPM development process. This simplified superset consists of three data types specific to BPM/OLAP data transfer. These are defined as (1) dimension, (2) measure, and (3) natural data types. The application of these three data types greatly improves upon prior art data type definitions and more effectively meets the needs of OLAP/BPM data transfer.

Prior art implementations of ETL leverage database inserts or deletes into predefined table constructs to facilitate its transformational process and data flow. This invention introduces a data abstraction layer on top of standard database functionality that explicitly limits the use of INSERT or DELETE SQL commands during the transformational phase of the data pipeline. This constraint enforces improved technique and best practices around data process performance. There is no prior art that applies this approach. For the platforms and technologies used, this approach substantially increases the performance of the data pipeline, standardizes the functionality, and prevents developer from applying random SQL commands where not appropriate. This acts as a governor to prevent inefficient SQL to be written into the data pipeline or data maps, while simultaneously automating and simplifying the development process.

Data structures in the data pipeline are not fixed constructs but dynamic constructs that are created and destroyed during the load cycle. Since no SQL inserts or deletes are performed during the transformational process, transformational tables are instead dynamically created and destroyed on the fly based on the data map definitions. A transformation audit trail is provided for troubleshooting.

This invention is standardized based on configuration grids rather than loosely defined scripts or workflows. This structured approach allows developers to write code where needed in a structured organized fashion while still maintaining flexibility. This also allows a high degree of usability and allows Integration Templates to be injected into the framework as needed.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

Figure 1:
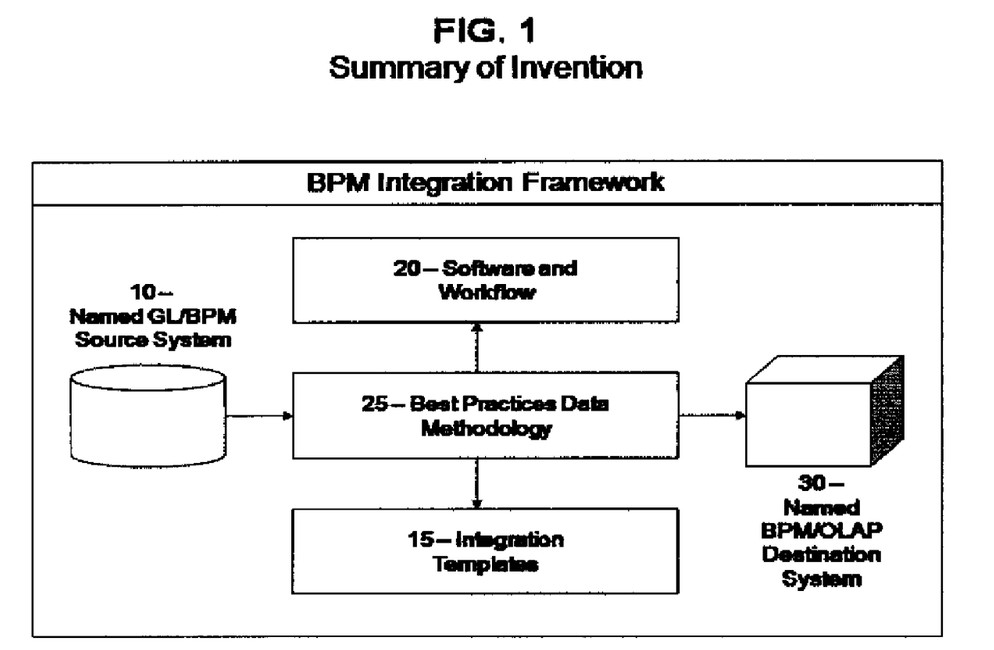
FIG. 1 is a diagram that depicts the overall BPM integration framework.

Referring now to FIG. 1, this diagram depicts three primary parts of the invention. The data connection Methodology (25) is a series of sequentially arranged commands, protocols, security and performance tests, and checkpoints arranged in a structured standardized framework along a successively staged, sequence-dependent data flow process. ETL techniques are employed but are contoured to the specifics of high performance point-to-point data transfer between GL and BPM. This methodology promotes single-point integration methodology, meaning it links directly to the named GL system and does not use a multi-phase process, such as a flat file. (While this methodology promotes a single-point process, it can pull from flat file sources or any other ODBC compliant source). This is a Sarbanes-Oxley compliant methodology.

The BPM Integration framework requires two logical prerequisite components to be in place before functionality can be achieved. Prerequisite 1 is an ODBC-compliant GL Source System (10) accessible via TCP/IP. Prerequisite 2 is a named BPM Destination System (30) accessible via TCP/IP. The BPM Destination System (30) is the target of the results of the BPM integration framework. The BPM integration framework assumes, within the destination system, the existence of a single fact table or an array of fact tables. The assumption is also made that the BPM conforms to OLAP standards and applies OLAP concepts. Cubes may or may not reside atop the fact table array. These prerequisite components and their logical sub-components can be installed on a single physical machine or span multiple physical machines grouped in any combination.

Figure 2:
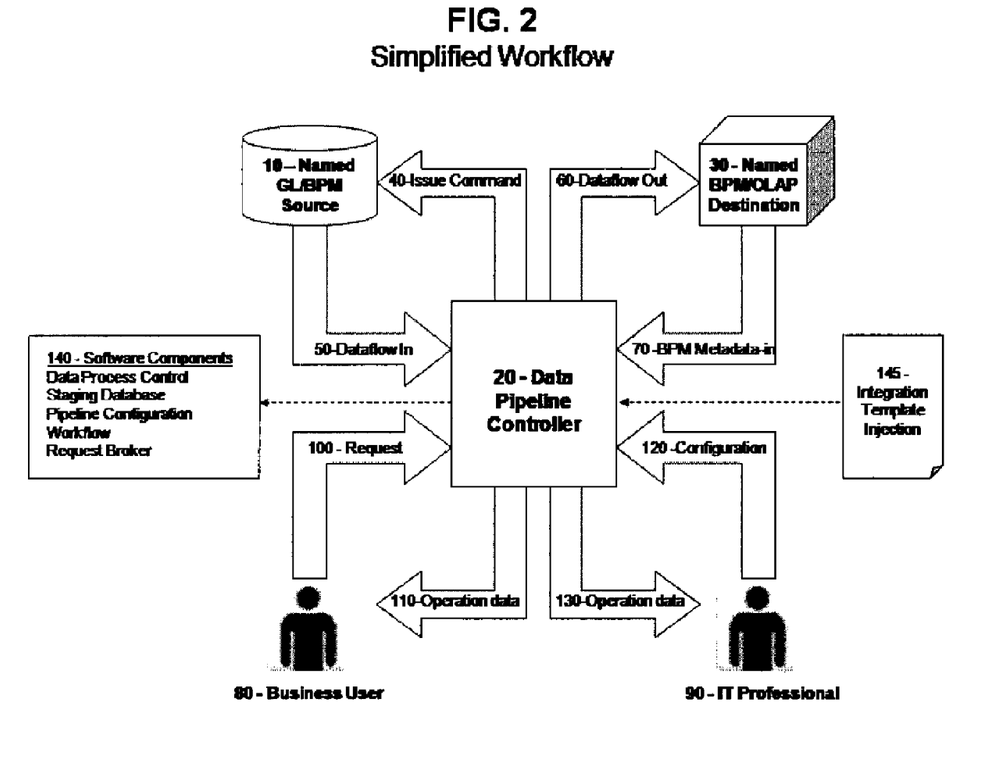
FIG. 2 is a diagram that depicts the workflow of the invention in simplified form.

FIG. 2 summarizes the key components of the surrounding workflow. The Data Pipeline Controller (20) is the hub of the BPM integration framework. This controls the command issuing, dataflow/workflow, and authentication and provides overall process management. There are three primary task phases within the data connection methodology: source, staging and deployment. Each one of these phases contains tasks and subtasks.

The Data Pipeline Controller comprises 5 distinct software modules: Automation Workflow, Staging Database, Data Process Control, Pipeline Configuration and Request Broker (140). The Data Pipeline Controller issues a series of commands (40) to the Named GL Source system (10). The purposes of these commands are to remote stage and extract data from the Source system (10) and prepare it for load into the Named BPM Destination system (30). The commands (40) are issued in SQL syntax via ODBC over TCP/IP protocol. Security authentication to the GL source system occurs prior to the commands being issued. The result of the commands issued (50) is returned as a tabular dataset and localized into the Data Pipeline Controller (20). This tabular dataset is stored in a SQL Server table in preparation for the transformation, or staging phase, of the data connection methodology. There can be multiple process threads defined in one data process controller.

The Data Pipeline Controller (20) dynamically accesses BPM metadata (70) during the transformational process. The Data Pipeline Controller uses this metadata to identify characteristics of the BPM Destination system (30) that are required for deploying and transforming data. The results of the transformational process (60) are sent from the Data Pipeline Controller (20) to the Named BPM Destination (30). Business users (80) are the custodians of the operational process.

There are two phases to the lifecycle of the BPM integration framework and its surrounding components: a design-and-configuration phase, and an operational phase. The design-and-configuration phase is managed by the IT Professional (90). The operational phase is controlled by the Business Users (80).

During the operational phase, Business Users can issue commands into the Data Pipeline Controller to initiate the extraction process. This is known as a request (100). There are two types of requests (100): scheduled and on-demand. The operational data of the Data Pipeline Controller is viewed and analyzed by the Business Users. Operational data is defined as current extraction status, success/failure, job history, pipeline volume, and kickout data analysis (110). Operational data comes from various attributes derived from LOG tables, ETL tables, the SQL Server Agent API, and DTS logging.

Integration templates (145) can be automatically injected into the data process controller during the design-and-configuration phase of the BPM integration framework. There is no logical limit to how many different templates may be injected. Once injected, templates may be adjusted and tuned to better meet the needs of the integration scenario. An automated injection mechanism is provided as a sub-system to the data process control.

Figure 3:
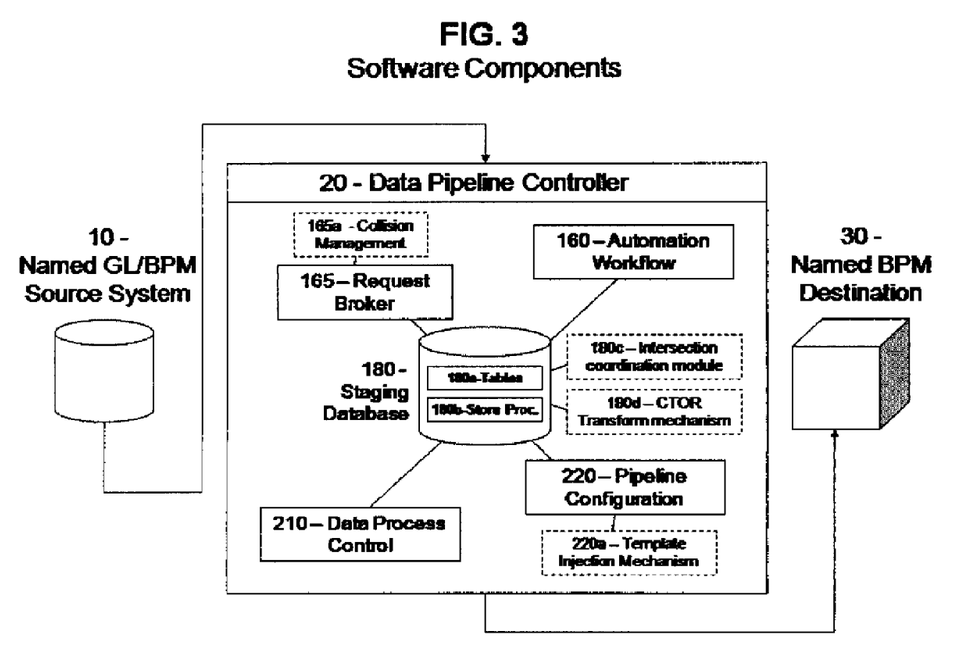
FIG. 3 is a diagram which depicts the various software components of the invention and their interrelationship.

Referring now to FIG. 3, this diagram shows the primary software components. The Data Pipeline Controller (20) comprises five distinct physical software modules: Workflow (160), Staging Database (180), Data Process Control (210), Pipeline Configuration (220) and Request Broker (165).

The Request Broker (165) is built as a brokering agent to control asynchronous operation of on-demand and scheduled requests within the Data Pipeline Controller (20). The Request Broker dynamically creates and executes jobs. The creation/execution relationship varies for on-demand requests vs. scheduled requests.

The Automation Workflow component (160) controls the virtual workflow of the data pipeline. It applies ETL-based techniques and facilitates the data flow between all phases of the ETL process: source, stage, and destination. The Workflow component (160) logs and records the operational data of the process. This includes the status of each step of the process, the duration, the data volume and the success or failure. In the case of failure, the exact error detail is recorded to aid in the troubleshooting process.

The Collision Management module (165a) enforces a sequential queuing and collision control of non-parallel execution of templates and resides as a sub-component of this module.

The Staging Database (180) is an RDMS component. It is within the Staging Database (180) where all of the transformation and staging functions of the data connection methodology occur. The staging database also acts as a repository for the BPM integration framework configurations, process logs, data transformational audit trails and metadata. When the framework is installed, a standard set of database objects is provided to facilitate the functionality of the staging database. These objects are Tables (180a) and Stored Procedures (180b).

There are three types of Tables (180a). Type 1 tables contain the configurations for a specific GL to BPM scenario. These configuration settings identify the server environment, the transformational business rules, security and connection information, behavior options, performance tuning switches and source query definitions. Type 2 tables are ETL audit trail tables. These tables write the results of each process-dependent step of the ETL process to the database. This provides a transformational audit trail as inbound data is changed, scrubbed and manipulated though the data pipeline. Type 3 tables are LOG tables that log the operational data of the data pipeline controller. This would include success/failure, execution time, pipeline volume and errors if they occur. The Stored Procedures (180b) read, execute and apply sequential commands off of the three table types to drive the execution of the data connection methodology.

The Intersection Coordination Module (180c), which coordinates keyless data synchronization and reload, resides as a sub-component of the staging database and is implemented using a SQL stored procedure.

The CTOR transformation mechanism (180d) handles YTD vs. periodic measure format, resides as a sub-component of the staging database, and is implemented using a SQL stored procedure.

The Data Process Control (210) allows Business Users to view, analyze, and control the Data Pipeline Controller (20).

Pipeline Configuration (220) is built for the IT Professional and facilitates the design and configuration phase of the Data Pipeline Controller. This is primarily a front end, or a series of screens enabling the IT Professional the ability to configure the progress of data movement through the various stages of data transmission. The Template Injection Mechanism (220a), which automates the template injection process, is implemented as a subcomponent of this module.

Figure 4:
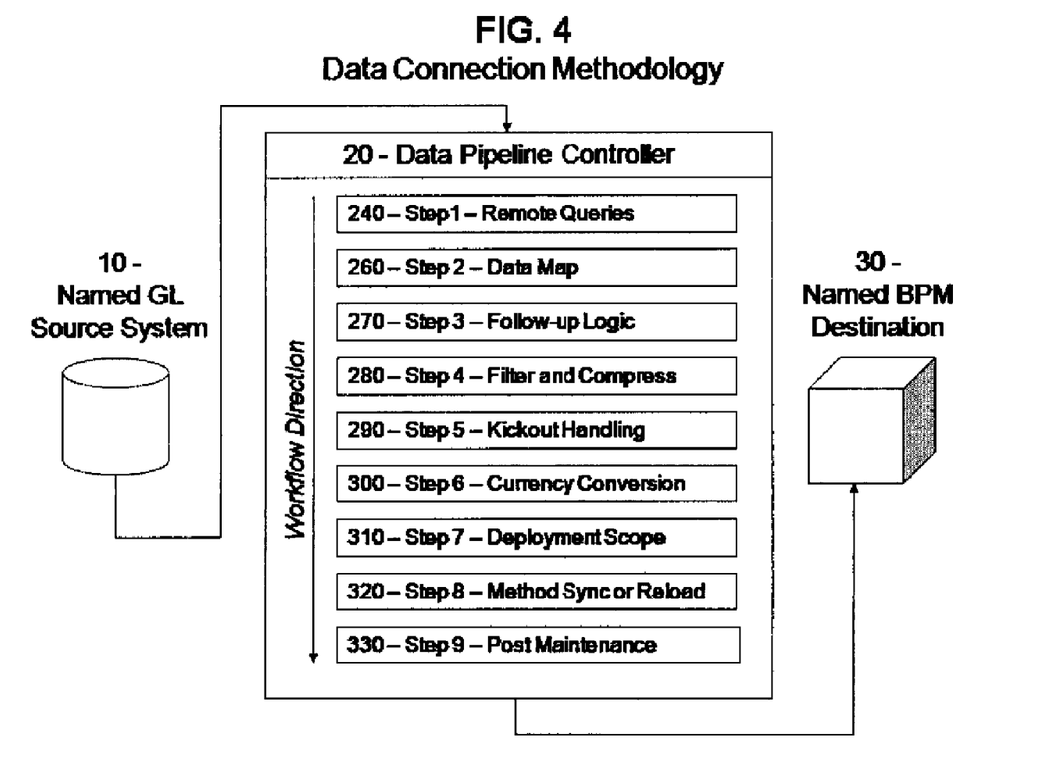
FIG. 4 is a diagram which depicts the data connection methodology of the invention.

FIG. 4 depicts the primary data connection methodology tasks and how they relate to the perquisite components. The direction of the data flow into the Data Pipeline Controller (20) is one-way inbound. The Data Pipeline Controller (20) manages the data connection methodology workflow. The data connection methodology comprises 9 primary logical, configurable steps. These logical steps are a series of sequentially arranged commands along a successively staged flow. These are sequence-dependent process stages. Some are required and some are optional.

The first primary logical step on the data connection methodology is Remote Queries (240). This step facilitates the extraction of data from the Named GL Source System (10). The Data Pipeline Controller (20) issues a command against the Named GL Source System (10) in the form of a SQL statement. This SQL statement is issued via ODBC and uses TCPIP protocols. The GL Source System (10) responds to this command by returning a result set of data. The results are localized and prepared for manipulation for subsequent steps. Thus, a local copy of the query result set is created and stored within the Data Pipeline Controller (20). The remote queries are parameterized. These parameters can be set in the Data Process Control.

The Data Map step (260) provides the primary data mapping from source to destination. The data map process is achieved by mapping inbound source fields from the GL Source (10) to outbound fields of the BPM Destination System (30). The Data Map step (260) is dependent upon the successful execution of Remote Queries step (240). Mapping information is stored in a highly standardized and structured configuration grid. Data maps can be as simple as a one-to-one column mapping or sophisticated multi-pass transformations containing complex aggregations, data manipulations and remote lookups. Each line in the configuration grid represents a new inbound field definition. The data map applies its transformations making multiple passes of SQL "SELECT INTO" logic.

Follow-up Logic (270) is used for any miscellaneous or supplemental transformations that need to be applied to the inbound data that was not able to be applied in the Data Map (260). This is ideal for data renaming, null scrubbing, or data polishing. The Follow-up Logic (270) applies SQL "UPDATE" logic to make its transformations. It is dependent on the successful execution of the Data Map (260). The update is applied to the final pass results of the Data Map (260).

Filter and Compress (280) is multi-phased. Filtration allows for any extraneous data, either that has cumulated during the prior steps or that has originated from the source, to be filtered out. This filtration step is configurable and is optional. Compression consolidates any fragmented balances residual in the Remote Queries (240), localize remote data, Data Map (260), or Follow-up Logic (270). Compression requires no configuration and automatically occurs. As a part of the compression process, the result set table signature is explicitly cast to that of the destination fact table. The result of this is an exact replica of the destination fact table format, data types and column order. This process is dependent upon the successful execution of the prior data connection methodology steps.

Kickout Handling (290) provides referential integrity of the inbound data flow against the named BPM Destination System (30). Data validation occurs at a line-by-line level. Data that does not pass referential validation is routed into a separate kickout area of the Data Pipeline Controller (20) stage database. The Data Pipeline Controller (20) provides Business Users access to the kickout area for analysis. This step is process dependent on the successful execution of Filter and Compress (280).

Currency Conversion (300) is an optional task and can be activated or deactivated, depending on the Business User need for this type of functionality. This step is process dependent on the successful execution of Filter and Compress (280) and Kickout Handling (290).

Deployment Scope (310) limits the dynamic Reload or Sync determination to certain fields.

Method (320) controls how the final results of the data connection transformation process are deployed into the named BPM destination system. There are two methods: sync and reload. The decision on which strategy to employ is made at time of process execution and is determined based on the business need. The two together provide Business Users a complete BPM load solution to meet all business scenarios.

Post Maintenance (330) provides miscellaneous database tasks such as staging clean up, index maintenance, and cube processing.

Figure 5:
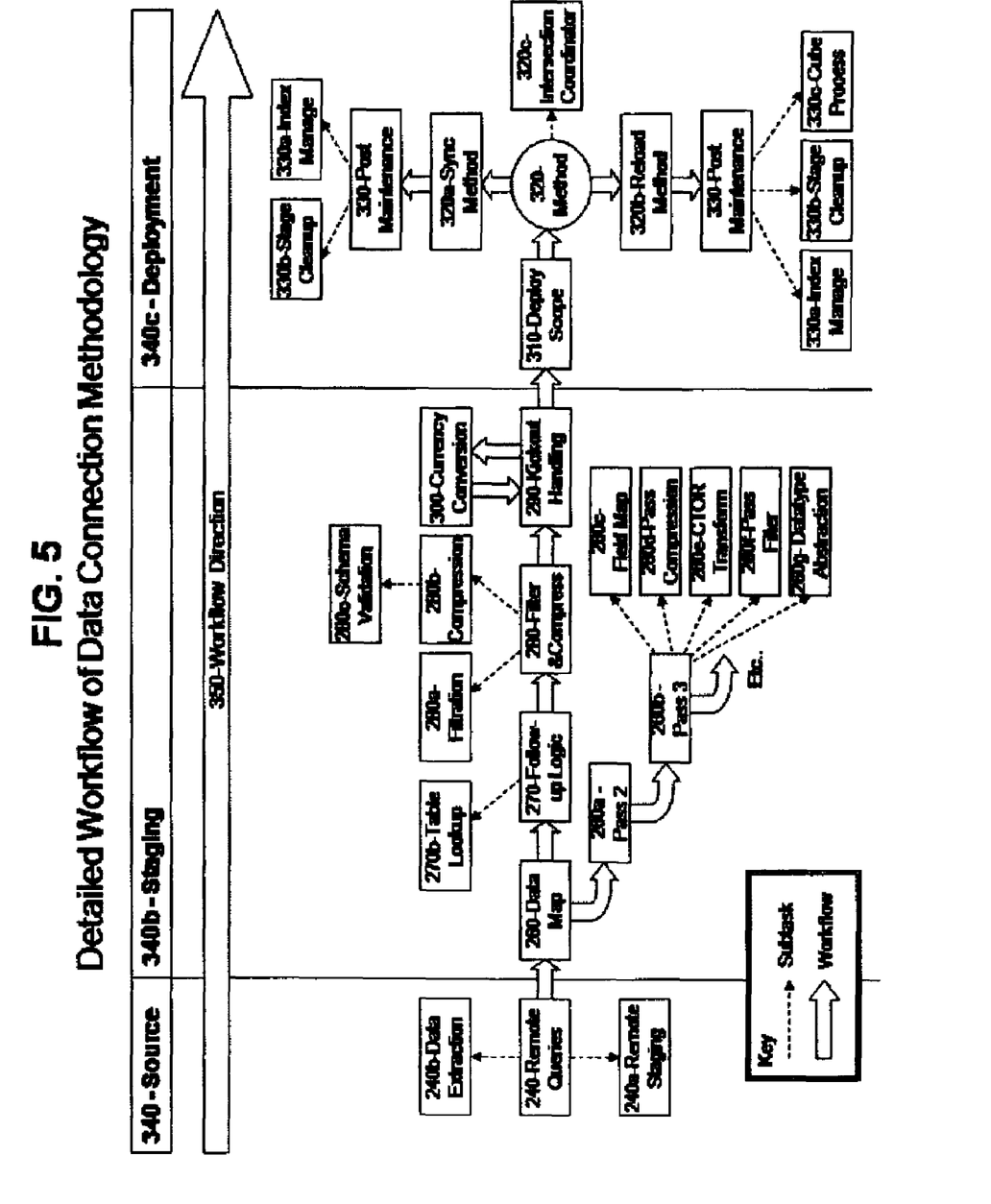
FIG. 5 is a diagram which depicts the detailed workflow of the data connection methodology, including tasks and subtasks.

FIG. 5 depicts the detailed workflow of the data connection methodology. It expresses the primary tasks and the subtasks in a directional context (350). The workflow direction is unidirectional, always moving away from the source, through the data pipeline, into the destination.

Each task and subtask is categorized into one of the three primary ETL phases. Source (340) relates to the source system and is considered the extraction phase of ETL. Staging (340b) is the localization of source data into the Data Pipeline Controller and the transformation and readiness of data before it is loaded to the destination system. Staging is the same as the transformational phase of ETL. Deployment (340c) is the method of how the finalized data is deployed into the BPM destination system. This is equivalent to the Load phase of ETL.

Remote Queries (240), also described in FIG. 4, is subdivided into two classes of commands that are issued against the source system: Remote Staging (240a) and Data Extraction (240b). Remote Staging entails the execution of remote commands against the source system. Remote staging provides a successive series of remote extractions against the source system; the results of each one of these commands yields itself in a table within the source system. In given scenario, this allows the ability to offload some of transformational load onto the source system itself. This is especially helpful in distributed environments where the source system may have more hardware resources dedicated to the transformation process than the Data Pipeline Controller server. The Data Extraction command (240b) is the command that actually extracts the data from the source system and returns the results to the Data Pipeline Controller. Remote Staging (240a) is optional, whereas Data Extraction (240b) is required. Both Remote Staging and Data Extraction can be parameterized to allow for dynamic selection control to occur at the time of request.

Data Map (260) is one of the most sophisticated steps in the data connection methodology workflow. This step resides in the staging phase (340b) of the data connection methodology. The Data Map (260) workflow is logically subdivided into sequential pass layers (260a, 260b). There is no logical limit to how many pass layers there can be. These sub-steps are a series of process dependent transformations. Each pass layer is translated into a "SELECT INTO" SQL statement and yields its results into a new table. This technique is optimal for performance while simultaneously providing a transformational audit trail. Pass layers contain a collection of Field Maps (260c). There are three different types of Field Maps (260c) that are defined in the BPM integration framework: SQL, VALUE, and COLUMN. A COLUMN field map maps column-to-column data. A VALUE field map is used for the hard coding of values in a field. A SQL data map applies defined SQL statements to the transformation pipeline. This is used for line-by-line logical operations that are not columns or values (concatenations, suffixing, prefixing, embedded sub-queries, casting, etc.). Pass layers can be a collection of data maps grouped together or a single data map, depending on the need of the process. This is set during the design-and-configuration phase by the IT Professional.

Pass Compression (260d) and Pass Filtering (260f) are attributes that can be applied to pass layers (260a, 260b). Pass Compression (260d) applies compression between pass layers. There are two primary compression types that can be applied: DISTINCT and AGGREGATION. Distinct-type compresses data based on distinct lines. The aggregation compression bases its compression on aggregate functions such as sum, average, or count. An aggregation compression can be based on any SQL Server supported aggregation function. Pass Filtering (260f) allows extraneous or duplicate data to filtered in-between pass layers and is optional.

CTOR-standardized transformation (260e) is an abstract and sophisticated ETL transformation that is reoccurring in BPM integrations. (CTOR stands for columns-to-rows).

During standard load cycles in OLAP/BPM-based systems, there are two types of balance storage methodologies when addressing the loading of business intelligence data from a source GL system to BPM destination system. These are YTD vs. Periodic. Management of the balance storage type is an essential part of the OLAP load process. Balance storage type management is not effectively addressed in the prior art.

The configuration grid is configured with data elements and attributes required for the transformation. The two primary attributes that are defined are: (1) the new dimension name that defines the measure column content headers; and (2) the new measure name that defines the measure source columns and the new field they will be consolidated into. Both of these elements can have one of three characteristics or dimension types that are also defined in the configuration grid. These types are: (1) value; (2) column; and (3) SQL. The blend of the two data elements, combined with the attributes, cover every possible column-to-row transformation scenario.

This is an example of how a CTOR matrix configuration pattern for periodic balance loading would look:

| New Dimension Name | New Dimension Type | New Dimension Content | CTOR Measure | CTOR Type | CTOR Content |
|---|---|---|---|---|---|
| Month | Value | Period1 | Amount | Column | Period1Col |
| Month | Value | Period2 | Amount | Column | Period2Col |
| Month | Value | Period3 | Amount | Column | Period3Col |
| Month | Value | Period4 | Amount | Column | Period4Col |

This is an example of how a CTOR matrix configuration pattern for YTD balances balance loading would look:

| New Dimension Name | New Dimension Type | New Dimension Content | CTOR Measure | CTOR Type | CTOR Content |
|---|---|---|---|---|---|
| Month | Value | Period1 | Amount | SQL | Period1Col |
| Month | Value | Period2 | Amount | SQL | Period1Col + Period2Col |
| Month | Value | Period3 | Amount | SQL | Period1Col + Period2Col + Period3Col |
| Month | Value | Period4 | Amount | SQL | Period1Col + Period2Col + Period3Col + Period4Col |

Based on these configurations, the challenges of the CTOR process development has been completely automated and controlled via use of this configuration pattern.

Follow-up Logic (270), also described in FIG. 4, resides in the staging phase (340b) of the data connection methodology (FIG. 1, 25) workflow. Follow-up logic applies SQL "UPDATE" logic to the results of the final pass layer (260b) from the Data Map (260). Follow-up Logic (270) has the ability to participate in a Remote Table Lookup (270b) to restrict the results of its effect, thus giving more dynamic transformation capability to the data pipeline if needed.

Filter and Compress (280), also described in FIG. 4, resides in the staging phase (340b) of the data connection methodology workflow. This step has several key subtasks. Filtration (280a) allows data to be explicitly excluded or included in the data pipeline process. Filtration (280a) is optional and is configured during process design and configuration phase by the IT Professional. Compression (280b) does a final aggregation compression on the data flow, consolidating all unique field combinations into a single summarized line. This solves vertical fragmentation and sends the data into the BPM destination system into a highly optimized state. This step automatically occurs as part of the Filter and Compress (280) step and requires no configuration. As part of the Compression (280b) process, it is at this point Schema Validation (280c) occurs against the named BPM destination system. The Data Pipeline Control dynamically analyzes the BPM destination schema field names and data types, and loads it locally as metadata. This localized schema metadata is then applied onto the inbound data pipeline. The net result of this is an exact replica of the BPM fact table(s), field names, field order, and data types, ready to be deployed into the production BPM system. The Data Map (260) needs to be configured appropriately for successful operation of the Filter and Compress step (280).

Kickout Handling (290), also described in FIG. 4, is the final required step of the staging phase (340b) of the BPM integration framework. Kickout Handling provides referential integrity of the inbound data against the Named BPM System. There are three tiers of kickout detail generated for analysis during this process: FACT, DETAIL, and SUMMARY. FACT is the raw line-by-line detail preserved and tagged in its natural state. DETAIL is a detailed report derived from the natural fact data identifying a distinct list of kickout members by field name, the net amount of currency, and rows affected by each unique member. SUMMARY provides a simple top level summary of the fields affected and the amount of unique kickouts members per field.

Currency Conversion (300), also described in FIG. 4, allows inbound data to be converted from an input currency to a report currency based on a table of fixed currency rates. This task is optional depending on the business need. A rate type needs to be identified: MULTIPLY or DIVIDE. MULTIPLY uses multiplication as the calculation operator; DIVIDE uses division as the calculation operator. Which one is chosen is contingent on the type of rate that is being used to do the conversion.

Deployment Scope (310) is the first task in the deployment phase (340c) of the data connection methodology. The purpose of the task is to limit the dynamic Reload or Sync determination to certain fields and unique data points within selected fields. The process of determining which data should be moved out to production and which data should not is a dynamic one. The system compares the inbound data flow against the data in the Named BPM Destination System. It uses the results of this comparison to determine how to synchronize the data. The Deployment Scope (310) is a means of guiding this process to dynamically determine which fields to synchronize against. This step is process-dependent on the successful execution of the prior BPM integration framework steps.

Method (320) is a decision point in the workflow structure. Method (320) controls how the final results of the data connection transformation process are deployed into the named BPM destination system.

There are two methods that can be employed: Sync (320a) or Reload (320b). Both of these deployment methods are part of the deployment phase (340c) of the data connection process. The Method (320) is chosen at the time of request by Business Users using the Data Process Control.

The Sync Method (320a) does side-by-side, line-by-line comparison of the final results of the data connection methodology transformational process and the production data in the named BPM destination system, based on the set Deployment Scope (310). Based on this comparison it calculates the differences. These differences only are then deployed to the production system in an un-optimized state. This method has the benefits of immediate performance; data optimization is not managed, and assumes this responsibility to the BPM Destination System (30).

The Reload Method (320b) takes a different strategy. The Reload Method will delete the data from the Named BPM Destination System (FIG. 4, 30) based on the Deployment Scope (310) and will deploy all inbound data to production, regardless of the differences, in an optimized state. This method has the benefit of completeness; the Data Pipeline Controller (FIG. 4, 20) assumes ownership over the data optimization process, therefore offsetting longer-term maintenance efforts of the BPM destination system.

The Intersection Coordinator (320c) provides a data coordination sub-system that makes matching decisions through the using of a concatenated subset of all columns in both the inbound data set and the targeted destination system table(s) at time of execution. These intersections are matched against one another and identified as one of three types of data: existing, new, and targeted deletions. Once the data coordination subsystem completes its identification process, it then loads the new data into the destination system.

Post Maintenance (330) is the final step of the deployment phase (340c) of the data connection methodology. This step manages database maintenance tasks such as staging table clean up, index maintenance, and cube processing. Index Management (330a) manages the database table indexes on the destination BPM database after the Sync (320a) or Reload (320b) deployment process is complete. Different degrees and strategies of index management can be configured during data pipeline design. Stage Cleanup (330*b*) is an optional sub task. After the transformational steps in the data connection methodology are executed, they leave a transformational audit trail of result tables in the stage database. Stage Cleanup (330*b*) deletes these tables from the staging database. This is used in scenarios where hardware resources are a constraint. The Cube Processing task (330*c*) is a unique to the Reload method (320*b*). This is a specialty task that evokes a cube-refresh data process in scenarios where a cube resides atop the relationship fact table array of the BPM destination system.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of data migration and integration in an automated, computer-implemented system comprising the steps of:

extracting the data from a named source by remote queries;

mapping the data from the source to a destination by mapping inbound source fields from the source to outbound fields of the destination;

providing supplemental transformations to inbound data for data renaming, null scrubbing and data polishing;

filtering extraneous data that has accumulated during prior steps or that has originated from the source;

compressing the data to consolidate any fragmented balances to provide a set table signature that provides a replica of the destination fact table format, data types and column order;

validating data line by line to provide referential integrity of the inbound data flow against the named destination system;

routing data that does not pass referential validation to a kickout area of the data process controller;

comparing the inbound data flow to the data in the named destination to determine how to synchronize the data to limit it to certain fields; and deploying the data connection transformation process to the destination.

2. The method of claim 1 wherein said deploying step comprises a synch method which performs side-by-side, line-by-line data comparison of the final results of the data connection transformation process and the final production data in a named destination system.

3. The method of claim 1 wherein said deploying step comprises a reload method which deploys all inbound data to final production regardless of the differences from an optimized state.

4. The method of claim 1 further including a post-maintenance step which provides staging cleanup, index maintenance and cube processing.

5. The method of claim 1 wherein said mapping step further includes identifying unique data intersections and synchronizing and/or reloading data against data intersection patterns without the use of primary keys.

* * * * *